US012034762B2

(12) United States Patent
Block et al.

(10) Patent No.: US 12,034,762 B2
(45) Date of Patent: Jul. 9, 2024

(54) METHOD AND SYSTEM FOR MANAGING APPLICATION VULNERABILITIES

(71) Applicant: JPMorgan Chase Bank, N.A., New York, NY (US)

(72) Inventors: Monika T S Block, River Forest, IL (US); Animesh Kotwal, Panvel (IN); Purvesh Shah, Mumbai (IN); Shamanth Murthy, Bengaluru (IN); Magesh Lakshmi, Aurora, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 229 days.

(21) Appl. No.: 17/659,207

(22) Filed: Apr. 14, 2022

(65) Prior Publication Data

US 2023/0283625 A1  Sep. 7, 2023

(30) Foreign Application Priority Data

Mar. 2, 2022 (IN) .............................. 202211011152

(51) Int. Cl.
 *H04L 9/40* (2022.01)
(52) U.S. Cl.
 CPC ...... *H04L 63/1433* (2013.01); *H04L 63/1416* (2013.01); *H04L 63/1425* (2013.01)
(58) Field of Classification Search
 CPC ............. H04L 63/1433; H04L 63/1425; H04L 63/1416; H04L 63/1441; H04L 63/10; H04L 63/20; G06F 21/577; G06F 2221/033; G06F 21/554; G06F 21/568
 See application file for complete search history.

(56) References Cited

U.S. PATENT DOCUMENTS

| | | | | |
|---|---|---|---|---|
| 9,977,904 B2* | 5/2018 | Khan | ................... | H04L 63/1433 |
| 10,129,118 B1* | 11/2018 | Ghare | ................... | H04L 43/028 |
| 10,552,616 B2* | 2/2020 | Bodin | ................... | G06F 21/577 |
| 10,719,611 B2* | 7/2020 | Mohan | ................ | H04L 63/1433 |
| 11,374,958 B2* | 6/2022 | Ngo | ........................ | H04L 63/10 |
| 2013/0276106 A1* | 10/2013 | Barton | .................... | G06F 21/56 726/22 |
| 2014/0075560 A1* | 3/2014 | Guy | ...................... | G06F 21/577 726/25 |
| 2015/0309813 A1* | 10/2015 | Patel | ..................... | G06F 21/577 703/22 |

(Continued)

*Primary Examiner* — Lizbeth Torres-Diaz
(74) *Attorney, Agent, or Firm* — Greenblum & Bernstein, P.L.C.

(57) ABSTRACT

A method for providing vulnerability management to facilitate application development and deployment is disclosed. The method includes receiving a monitoring request that includes an identifier, the identifier corresponding to an application; onboarding the application by using the identifier; generating a scheduled task for the application based on an outcome of the onboarding, the scheduled task relating to source code vulnerability analytics; automatically initiating, via an application programming interface, the scheduled task based on a predetermined parameter; determining whether a set of source codes that corresponds to the application includes a vulnerability based on a result of the automatically initiated scheduled task; and generating a ticket when the vulnerability is included in the set of source codes.

20 Claims, 6 Drawing Sheets

(56) References Cited

U.S. PATENT DOCUMENTS

| | | | |
|---|---|---|---|
| 2016/0127367 A1* | 5/2016 | Jevans | G06F 21/51 |
| | | | 713/152 |
| 2019/0050319 A1* | 2/2019 | Gondalia | G06F 11/3664 |
| 2021/0352096 A1* | 11/2021 | Yadav | H04L 63/1433 |
| 2022/0014561 A1* | 1/2022 | Caceres | G06F 16/951 |
| 2022/0222350 A1* | 7/2022 | Franzen | G06F 21/577 |
| 2022/0237301 A1* | 7/2022 | Godowski | G06F 21/53 |
| 2022/0342998 A1* | 10/2022 | Singh | G02B 27/0172 |
| 2022/0374218 A1* | 11/2022 | Monteiro Vieira | G06F 8/433 |
| 2023/0078033 A1* | 3/2023 | Yadav | H04L 63/1433 |
| | | | 726/25 |
| 2023/0164042 A1* | 5/2023 | Barth | H04L 67/63 |
| | | | 709/224 |
| 2023/0247043 A1* | 8/2023 | Luttwak | H04L 63/1433 |
| | | | 726/25 |
| 2024/0062264 A1* | 2/2024 | Trikha | G06Q 30/0282 |

\* cited by examiner

METHOD AND SYSTEM FOR MANAGING APPLICATION VULNERABILITIES

CROSS-REFERENCE TO RELATED APPLICATIONS

This application claims the benefit of Indian Provisional Patent Application No. 202211011152, filed Mar. 2, 2022, which is hereby incorporated by reference in its entirety.

BACKGROUND

1. Field of the Disclosure

This technology generally relates to methods and systems for vulnerability management, and more particularly to methods and systems for providing vulnerability and code scan management via automated job scheduling and automated issue ticketing to facilitate application development and deployment.

2. Background Information

Many business entities utilize expansive application networks to provide services for users. Often, rigorous vulnerability management of each application is required to ensure proper network operability. Historically, implementation of conventional application vulnerability management techniques has resulted in varying degrees of success with respect to effective and efficient administration of application vulnerabilities.

One drawback of using the conventional techniques is that in many instances, developers must periodically check an application code repository of each application to identify vulnerabilities, determine appropriate fixes, and initiate the appropriate fixes. For expansive application networks, the developers must track large numbers of vulnerabilities across numerous application repositories. As a result, management of application vulnerabilities is tedious and results in operational inefficiencies such as, for example, individually resolving duplicate vulnerabilities. Additionally, since the checks are based on individual developer actions, oversight of unresolved vulnerabilities is difficult.

Therefore, there is a need to provide vulnerability and code scan management via automated job scheduling and automated issue ticketing to facilitate effective application development and deployment.

SUMMARY

The present disclosure, through one or more of its various aspects, embodiments, and/or specific features or sub-components, provides, inter alia, various systems, servers, devices, methods, media, programs, and platforms for providing vulnerability and code scan management via automated job scheduling and automated issue ticketing to facilitate application development and deployment.

According to an aspect of the present disclosure, a method for providing vulnerability management to facilitate application development and deployment is disclosed. The method is implemented by at least one processor. The method may include receiving at least one monitoring request that includes at least one identifier, the at least one identifier may correspond to an application; onboarding the application by using the at least one identifier; generating at least one scheduled task for the application based on an outcome of the onboarding, the at least one scheduled task may relate to source code vulnerability analytics; automatically initiating, via an application programming interface, the at least one scheduled task based on a predetermined parameter; determining whether a set of source codes that corresponds to the application includes at least one vulnerability based on a result of the automatically initiated at least one scheduled task; and generating at least one ticket when the at least one vulnerability is included in the set of source codes.

In accordance with an exemplary embodiment, the at least one ticket may relate to a work item of a responsible party associated with the application, the work item may correspond to an activity in a backlog that is managed by the responsible party.

In accordance with an exemplary embodiment, the at least one ticket may include a standardized template that facilitates issue tracking and monitoring, the standardized template may include vulnerability detection tool information, vulnerability labeling information, and developer assignment information.

In accordance with an exemplary embodiment, the method may further include identifying at least one labeling strategy for the application based on the at least one vulnerability and a severity level; generating at least one graphical element for the application, the at least one graphical element may include a dashboard that contains information from the at least one ticket and the at least one labeling strategy; and displaying, via a graphical user interface, the at least one graphical element.

In accordance with an exemplary embodiment, the method may further include compiling data that relates to at least one from among the application and the at least one vulnerability, the data may include deadline information relating to resolution of the at least one vulnerability; and updating the at least one ticket to include the data.

In accordance with an exemplary embodiment, the method may further include automatically determining, by using at least one model, at least one mitigation action that relates to the at least one vulnerability; and updating the at least one ticket to include information that relates to the at least one mitigation action.

In accordance with an exemplary embodiment, the method may further include automatically initiating the at least one mitigation action based on a predetermined user setting; and generating at least one execution report, the at least one execution report may include data that corresponds to the automatic determining of the at least one mitigation action and the automatic initiating of the at least one mitigation action.

In accordance with an exemplary embodiment, the method may further include automatically determining whether at least one pull request that relates to the at least one vulnerability is generated, the at least one pull request may relate to a previously generated mitigation action for the at least one vulnerability; associating the at least one pull request with the at least one ticket when the at least one pull request is generated; and updating the at least one ticket to include information that relates to the at least one pull request.

In accordance with an exemplary embodiment, to onboard the application, the method may further include pulling, by using the application programming interface, data that corresponds to the application based on the at least one identifier; requesting, via a graphical user interface, at least one privilege setting that corresponds to the application, the at least one privilege setting may include at least one from among a scanning privilege setting and a reading privilege setting; generating a configuration file that corresponds to the application based on the pulled data and the at least one privilege setting; and persisting the configuration file in a source code repository that is hosting the application.

According to an aspect of the present disclosure, a computing device configured to implement an execution of a method for providing vulnerability management to facilitate application development and deployment is disclosed. The computing device including a processor; a memory; and a communication interface coupled to each of the processor and the memory, wherein the processor may be configured to receive at least one monitoring request that includes at least one identifier, the at least one identifier may correspond to an application; onboard the application by using the at least one identifier; generate at least one scheduled task for the application based on an outcome of the onboarding, the at least one scheduled task may relate to source code vulnerability analytics; automatically initiate, via an application programming interface, the at least one scheduled task based on a predetermined parameter; determine whether a set of source codes that corresponds to the application includes at least one vulnerability based on a result of the automatically initiated at least one scheduled task; and generate at least one ticket when the at least one vulnerability is included in the set of source codes.

In accordance with an exemplary embodiment, the at least one ticket may relate to a work item of a responsible party associated with the application, the work item may correspond to an activity in a backlog that is managed by the responsible party.

In accordance with an exemplary embodiment, the at least one ticket may include a standardized template that facilitates issue tracking and monitoring, the standardized template may include vulnerability detection tool information, vulnerability labeling information, and developer assignment information.

In accordance with an exemplary embodiment, the processor may be further configured to identify at least one labeling strategy for the application based on the at least one vulnerability and a severity level; generate at least one graphical element for the application, the at least one graphical element may include a dashboard that contains information from the at least one ticket and the at least one labeling strategy; and display, via a graphical user interface, the at least one graphical element.

In accordance with an exemplary embodiment, the processor may be further configured to compile data that relates to at least one from among the application and the at least one vulnerability, the data may include deadline information relating to resolution of the at least one vulnerability; and update the at least one ticket to include the data.

In accordance with an exemplary embodiment, the processor may be further configured to automatically determine, by using at least one model, at least one mitigation action that relates to the at least one vulnerability; and update the at least one ticket to include information that relates to the at least one mitigation action.

In accordance with an exemplary embodiment, the processor may be further configured to automatically initiate the at least one mitigation action based on a predetermined user setting; and generate at least one execution report, the at least one execution report may include data that corresponds to the automatic determining of the at least one mitigation action and the automatic initiating of the at least one mitigation action.

In accordance with an exemplary embodiment, the processor may be further configured to automatically determine whether at least one pull request that relates to the at least one vulnerability is generated, the at least one pull request may relate to a previously generated mitigation action for the at least one vulnerability; associate the at least one pull request with the at least one ticket when the at least one pull request is generated; and update the at least one ticket to include information that relates to the at least one pull request.

In accordance with an exemplary embodiment, to onboard the application, the processor may be further configured to pull, by using the application programming interface, data that corresponds to the application based on the at least one identifier; request, via a graphical user interface, at least one privilege setting that corresponds to the application, the at least one privilege setting may include at least one from among a scanning privilege setting and a reading privilege setting; generate a configuration file that corresponds to the application based on the pulled data and the at least one privilege setting; and persist the configuration file in a source code repository that is hosting the application.

According to an aspect of the present disclosure, a non-transitory computer readable storage medium storing instructions for providing vulnerability management to facilitate application development and deployment is disclosed. The storage medium including executable code which, when executed by a processor, may cause the processor to receive at least one monitoring request that includes at least one identifier, the at least one identifier may correspond to an application; onboard the application by using the at least one identifier; generate at least one scheduled task for the application based on an outcome of the onboarding, the at least one scheduled task may relate to source code vulnerability analytics; automatically initiate, via an application programming interface, the at least one scheduled task based on a predetermined parameter; determine whether a set of source codes that corresponds to the application includes at least one vulnerability based on a result of the automatically initiated at least one scheduled task; and generate at least one ticket when the at least one vulnerability is included in the set of source codes.

In accordance with an exemplary embodiment, the at least one ticket may relate to a work item of a responsible party associated with the application, the work item may correspond to an activity in a backlog that is managed by the responsible party.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
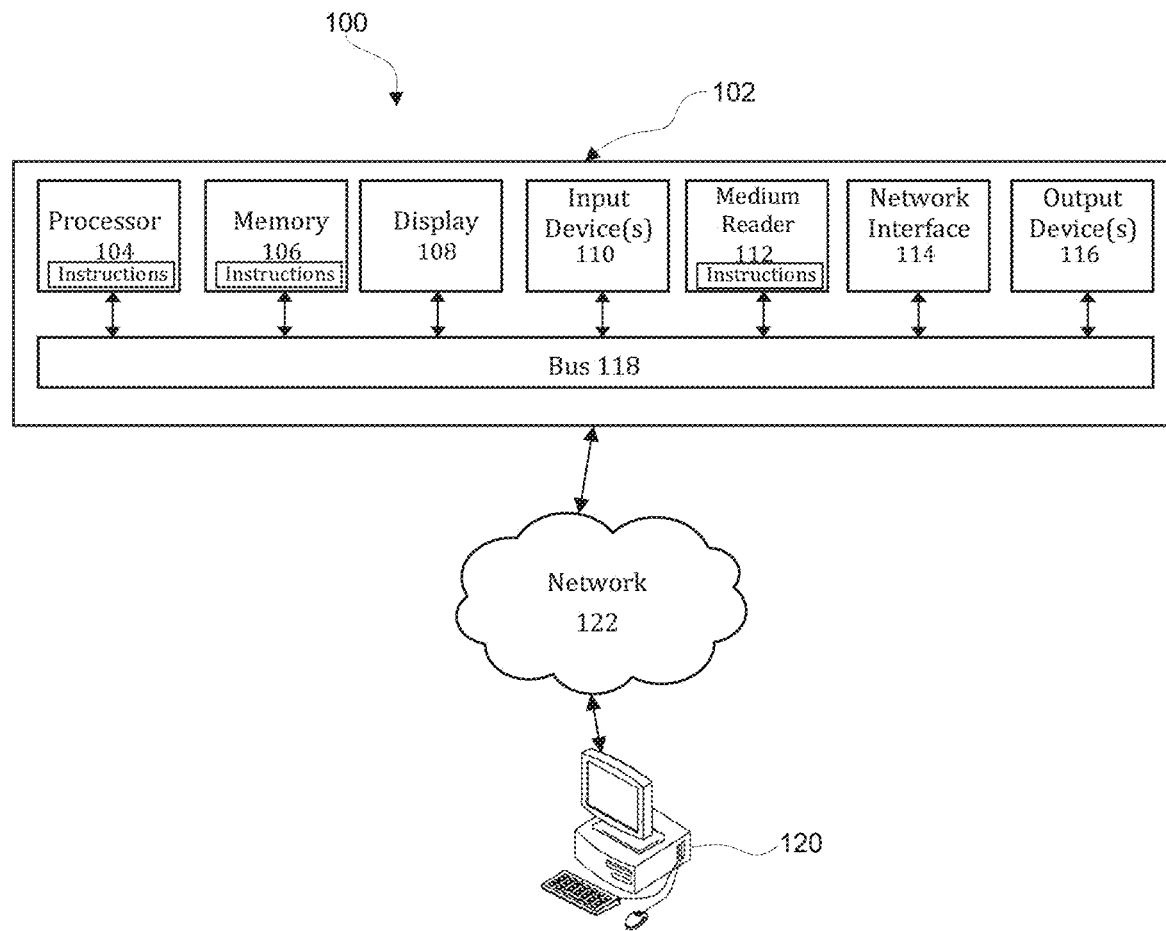
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing vulnerability and code scan management via automated job scheduling and automated issue ticketing to facilitate application development and deployment.

Figure 2:
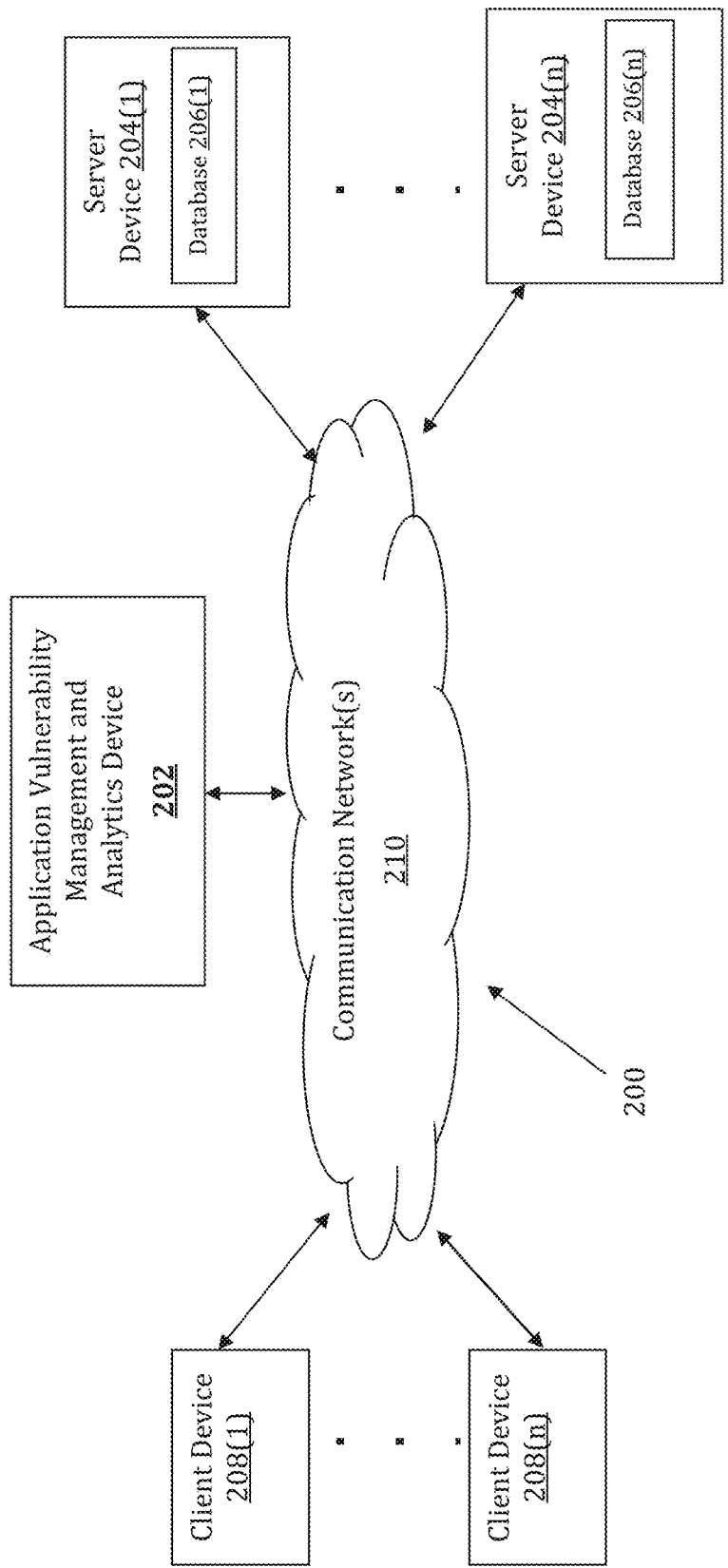
FIG. 2 illustrates an exemplary diagram of a network environment.

Referring to FIG. 2, a schematic of an exemplary network environment 200 for implementing a method for providing vulnerability and code scan management via automated job scheduling and automated issue ticketing to facilitate application development and deployment is illustrated. In an exemplary embodiment, the method is executable on any networked computer platform, such as, for example, a personal computer (PC).

The method for providing vulnerability and code scan management via automated job scheduling and automated issue ticketing to facilitate application development and deployment may be implemented by an Application Vulnerability Management and Analytics (AVMA) device 202. The AVMA device 202 may be the same or similar to the computer system 102 as described with respect to FIG. 1. The AVMA device 202 may store one or more applications that can include executable instructions that, when executed by the AVMA device 202, cause the AVMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AVMA device 202 itself, may be located in virtual server(s) running in a cloud-based computing environment rather than being tied to one or more specific physical network computing devices. Also, the application(s) may be running in one or more virtual machines (VMs) executing on the AVMA device 202. Additionally, in one or more embodiments of this technology, virtual machine(s) running on the AVMA device 202 may be managed or supervised by a hypervisor.

In the network environment 200 of FIG. 2, the AVMA device 202 is coupled to a plurality of server devices 204(1)-204(n) that hosts a plurality of databases 206(1)-206(n), and also to a plurality of client devices 208(1)-208(n) via communication network(s) 210. A communication interface of the AVMA device 202, such as the network interface 114 of the computer system 102 of FIG. 1, operatively couples and communicates between the AVMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AVMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AVMA devices that efficiently implement a method for providing vulnerability and code scan management via automated job scheduling and automated issue ticketing to facilitate application development and deployment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AVMA device 202 may be a standalone device or integrated with one or more other devices or apparatuses, such as one or more of the server devices 204(1)-204(n), for example. In one particular example, the AVMA device 202 may include or be hosted by one of the server devices 204(1)-204(n), and other arrangements are also possible. Moreover, one or more of the devices of the AVMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AVMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to monitoring requests, application data, application identifiers, scheduled tasks, source codes, predetermined parameters, application vulnerabilities, tickets, labeling strategies, pull requests, and mitigation actions.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AVMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AVMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AVMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AVMA device 202, the server devices 204(1)-204(n), or the client devices 208(1)-208(n), for example, may be configured to operate as virtual instances on the same physical machine. In other words, one or more of the AVMA device 202, the server devices 204(1)-204(n), or the client devices 208(1)-208(n) may operate on the same physical device rather than as separate devices communicating through communication network(s) 210. Additionally, there may be more or fewer AVMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
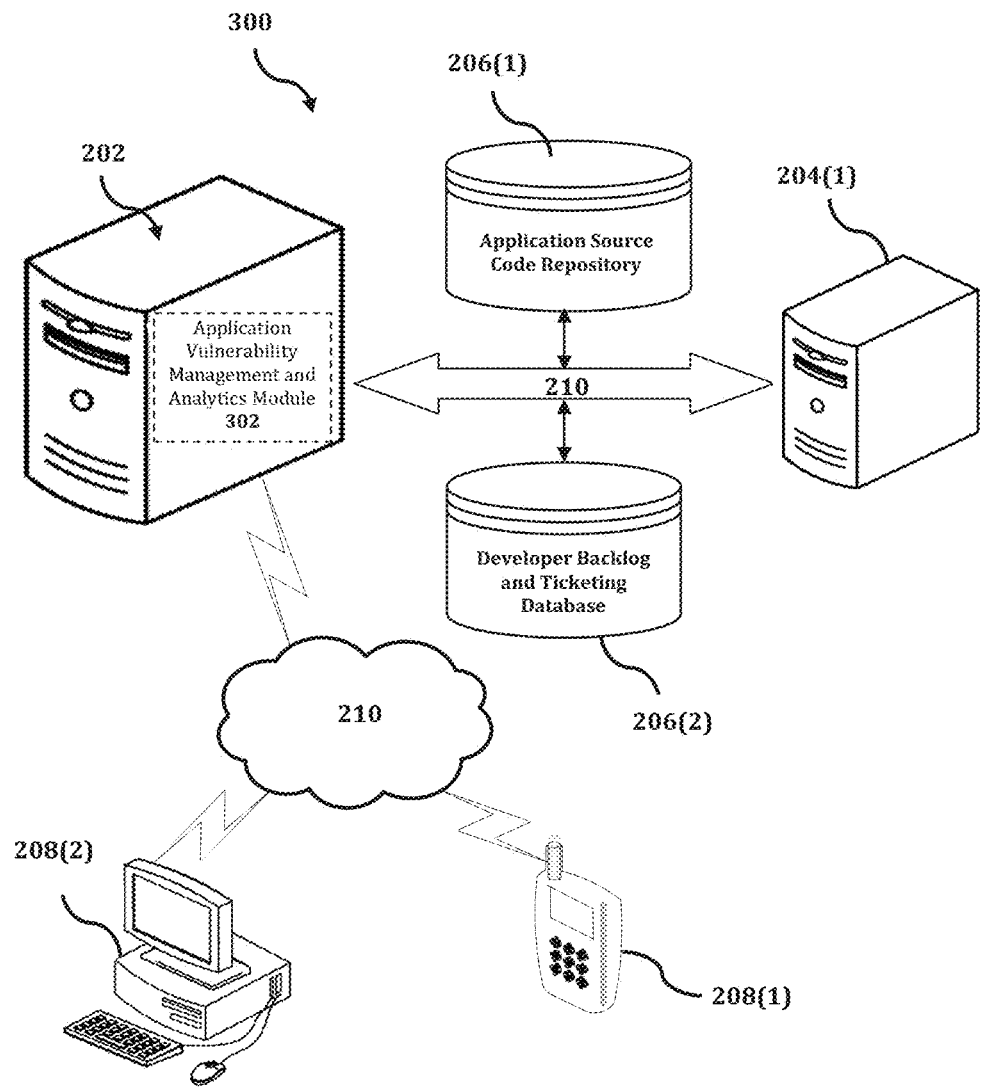
FIG. 3 shows an exemplary system for implementing a method for providing vulnerability and code scan management via automated job scheduling and automated issue ticketing to facilitate application development and deployment.

The AVMA device 202 is described and shown in FIG. 3 as including an application vulnerability management and analytics module 302, although it may include other rules, policies, modules, databases, or applications, for example. As will be described below, the application vulnerability management and analytics module 302 is configured to implement a method for providing vulnerability and code scan management via automated job scheduling and automated issue ticketing to facilitate application development and deployment.

An exemplary process 300 for implementing a mechanism for providing vulnerability and code scan management via automated job scheduling and automated issue ticketing to facilitate application development and deployment by utilizing the network environment of FIG. 2 is shown as being executed in FIG. 3. Specifically, a first client device 208(1) and a second client device 208(2) are illustrated as being in communication with AVMA device 202. In this regard, the first client device 208(1) and the second client device 208(2) may be "clients" of the AVMA device 202 and are described herein as such. Nevertheless, it is to be known and understood that the first client device 208(1) and/or the second client device 208(2) need not necessarily be "clients" of the AVMA device 202, or any entity described in association therewith herein. Any additional or alternative relationship may exist between either or both of the first client device 208(1) and the second client device 208(2) and the AVMA device 202, or no relationship may exist.

Further, AVMA device 202 is illustrated as being able to access an application source code repository 206(1) and a developer backlog and ticketing database 206(2). The application vulnerability management and analytics module 302 may be configured to access these databases for implementing a method for providing vulnerability and code scan management via automated job scheduling and automated issue ticketing to facilitate application development and deployment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AVMA device 202 via broadband or cellular communication. Of course, these embodiments are merely exemplary and are not limiting or exhaustive.

Upon being started, the application vulnerability management and analytics module 302 executes a process for providing vulnerability and code scan management via automated job scheduling and automated issue ticketing to facilitate application development and deployment. An exemplary process for providing vulnerability and code scan management via automated job scheduling and automated issue ticketing to facilitate application development and deployment is generally indicated at flowchart 400 in FIG. 4.

Figure 4:
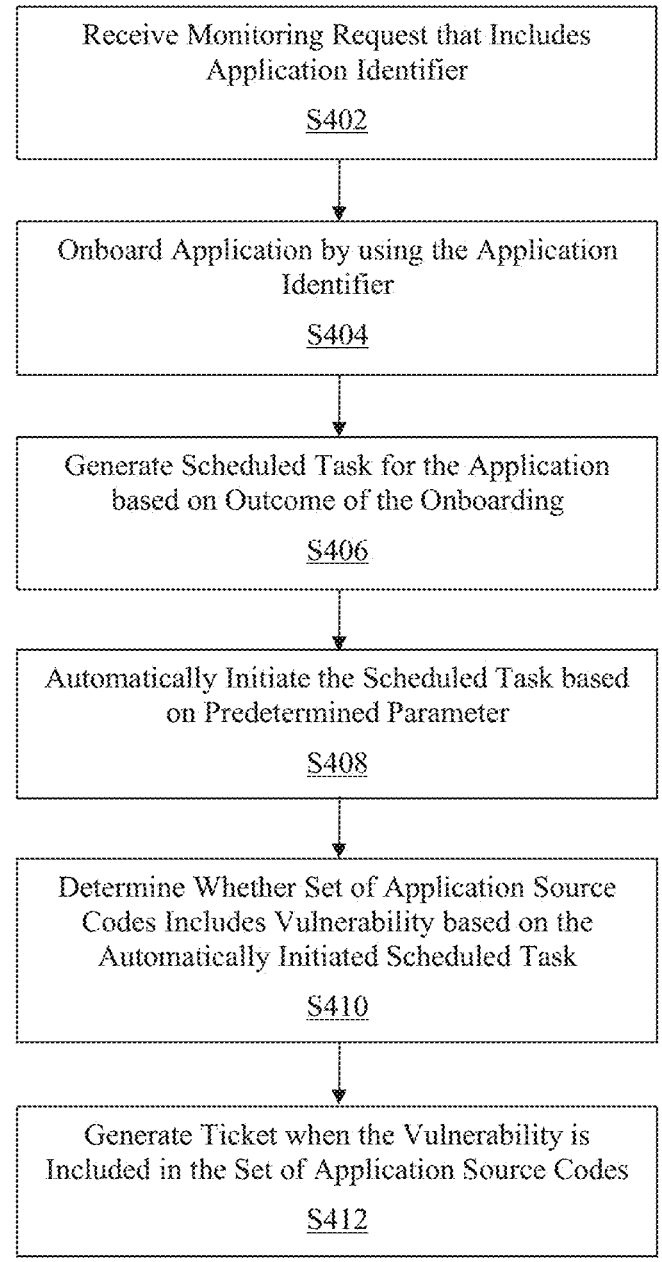
FIG. 4 is a flowchart of an exemplary process for implementing a method for providing vulnerability and code scan management via automated job scheduling and automated issue ticketing to facilitate application development and deployment.

In the process 400 of FIG. 4, at step S402, a monitoring request that includes an identifier may be received. The identifier may correspond to an application. In an exemplary embodiment, the monitoring request may relate to a request to monitor an application source code repository such as, for example, a BITBUCKET repository. The application source code repository may include source codes that correspond to the application.

In another exemplary embodiment, the monitoring request may include instructions to utilize an application vulnerability and code error assessment tool such as, for example, a RAVEN tool and a SONAR SCAN tool. The application vulnerability and code error assessment tool may scan an application source code to identify vulnerabilities such as, for example, vulnerabilities from a corresponding source code library as well as weaknesses in the written source code that may lead to the vulnerabilities. The request may indicate a desire to track an output related to the application vulnerability and code error assessment tool such as, for example, a RAVEN report and a unit test case (UTC) coverage percentage. In another exemplary embodiment, the monitoring request may include information that relates to a set of monitoring parameters, the application, and a group of corresponding developers. The application information may include application data such as, for example, fix version data and the corresponding developer information may include developer data such as, for example, a common group name across associated application projects.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, the microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the application may be onboarded by using the identifier. Onboarding the application may require a project configuration, a ticketing configuration, and a repository configuration. In an exemplary embodiment, onboarding the application may include pulling, by using an application programming interface, data that corresponds to the application based on the identifier. The data that corresponds to the application may include information such as, for example, hosting information, instance uniform resource locator (URL) information, project key information, project name information, and repository information. In another exemplary embodiment, the data may be pulled automatically and may be manually edited by a user with adequate credentials such as, for example, an administrator credential.

In another exemplary embodiment, a privilege setting that corresponds to the application may be requested via a graphical user interface to facilitate the onboarding process. The privilege setting may include at least one from among a scanning privilege setting and a reading privilege setting. The privilege setting may grant permission to the disclosed invention to perform actions such as, for example, scanning the source code of the application. In another exemplary embodiment, the privilege setting may be requested from a user that is associated with the application. The privilege setting may be requested from the user based on an associated credential such as, for example, an administrator credential.

In another exemplary embodiment, to facilitate the onboarding process, a configuration file that corresponds to the application may be generated based on the pulled data and the privilege setting. The configuration file may relate to a lightweight data-interchange format such as, for example, a JAVASCRIPT Object Notation (JSON) format that uses human-readable text to store and transmit data objects consisting of attribute value pairs and arrays. A secondary identifier such as, for example, a JIRA EPIC that is usable for associating vulnerability defects may also be generated based on the pulled data and the privilege setting. Then, in another exemplary embodiment, the configuration file may be persisted in a source code repository such as, for example, a BITBUCKET repository that is hosting the application.

At step S406, a scheduled task may be generated for the application based on an outcome of the onboarding. The scheduled task may relate to source code vulnerability analytics. In an exemplary embodiment, the scheduled task may relate to a job that is arranged to be performed based on a predetermined parameter such as, for example, an execution schedule as well as an application deployment schedule. The job may relate to a computing operation or group of computing operations that are treated as a single and distinct unit. In another exemplary embodiment, the scheduled task may correspond to instructions to initiate a vulnerability assessment tool such as, for example, a RAVEN tool, a SONAR scan tool, and a UTC coverage tool.

At step S408, the scheduled task may be automatically initiated via an application programming interface (API) based on a predetermined parameter. In an exemplary embodiment, the scheduled task may directly call an API that is associated with the vulnerability assessment tool on a scheduled basis. The API may relate to a software interface that facilitates interactions between a plurality of software components.

In another exemplary embodiment, the predetermined parameter may correspond to a recurring schedule. For example, the predetermined parameter may be based on a weekly execution schedule to facilitate monitoring of application development progress. In another exemplary embodiment, the predetermined parameter may be associated with an event. For example, the predetermined parameter may be based on a deployment event to provide final validation of the application prior to a transition of the application to a production environment.

At step S410, whether a set of source codes that corresponds to the application includes a vulnerability may be determined based on a result of the automatically initiated scheduled task. In an exemplary embodiment, the vulnerability may be determined based on output data that is received from the initiated vulnerability assessment tool. The output data may be received as raw data that requires additional formatting as well as structured data from the initiated vulnerability assessment tool. In another exemplary embodiment, the vulnerability may correspond to an abnormal application source code condition. The abnormal application source code condition may relate to a RAVEN vulnerability, a SONAR scan issue, and a UTC coverage percentage. A UTC coverage percentage that is below a predetermined threshold such as, for example, a seventy percent coverage threshold may indicate the abnormal application source code condition.

At step S412, a ticket may be generated when the vulnerability is included in the set of source codes. In an exemplary embodiment, the ticket may relate to a work item of a responsible party associated with the application. The work item may correspond to an activity in a backlog such as, for example, a JIRA backlog that is managed by the responsible party. In another exemplary embodiment, the ticket may include a standardized template that facilitates issue tracking and monitoring. The standardized template may include vulnerability detection tool information, vulnerability labeling information, and developer assignment information.

In another exemplary embodiment, a labeling strategy for the application may be identified based on the vulnerability and a severity level. The labeling strategy may correspond to a labeling action which tags a corresponding ticket with a predetermined label based on the vulnerability and the severity level. For example, the labeling strategy may indicate that a certain vulnerability is displayed on the corresponding ticket with an "S" label, which is associated with a high severity vulnerability. Consistent with disclosures in the present application, the labeling strategy, the predetermined label, and the severity level may be adjusted based on business requirements and/or user preference. In another exemplary embodiment, a graphical element may be generated for the application. The graphical element may include a dashboard that contains information from the generated ticket and the identified labeling strategy. In another exemplary embodiment, the graphical element may be displayable for a user via a graphical user interface.

In another exemplary embodiment, data that relates to at least one from among the application and the vulnerability may be compiled. The data may include deadline information relating to resolution of the vulnerability. For example, the data may include a deadline upon which the vulnerability must be resolved. Further, the data may include source code information such as, for example, a specific set of source code that corresponds to the vulnerability. Then, in another exemplary embodiment, the ticket may be updated to include the data.

In another exemplary embodiment, whether a pull request that relates to the vulnerability is generated may be automatically determined. The pull request may relate to a previously generated mitigation action for the vulnerability. In another exemplary embodiment, the pull request may be associated with the ticket when the pull request is determined to have been generated. Additionally, the ticket may be updated to include information that relates to the pull request. As will be appreciated by a person of ordinary skill in the art, identification of a previously generated mitigation action for the vulnerability may facilitate efficient resolution of the vulnerability by preventing duplicate efforts by a plurality of developers.

In another exemplary embodiment, a mitigation action that relates to the vulnerability may be automatically determined by using a model. The mitigation action may correspond to an action that resolves the vulnerability. For example, the mitigation action may correspond to a replacement of a faulty source code section with a source code section that does not include the vulnerability. Then, in another exemplary embodiment, the ticket may be updated to include information that relates to the automatically determined mitigation action.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the mitigation action may be automatically initiated based on a predetermined user setting. The predetermined user setting may correspond to a user preference for automatically initiating the mitigation action based on a severity level of a corresponding vulnerability. For example, a user may prefer to automatically resolve low level vulnerabilities while higher level vulnerabilities may warrant closer inspection. In another exemplary embodiment, an execution report may be generated. The execution report may include data that corresponds to the automatic determining of the mitigation action and the automatic initiating of the mitigation action.

In another exemplary embodiment, the execution report may enable a zoomed-in as well as a zoomed-out view of the vulnerabilities. The execution report may include a vulnerability budget utilization view for different stakeholders. The execution report may help find an exact application and a corresponding repository that causes a drop in an application fit score. The execution report may provide a high-level view of total vulnerabilities which are unattended, opened, and closed.

Figure 5:
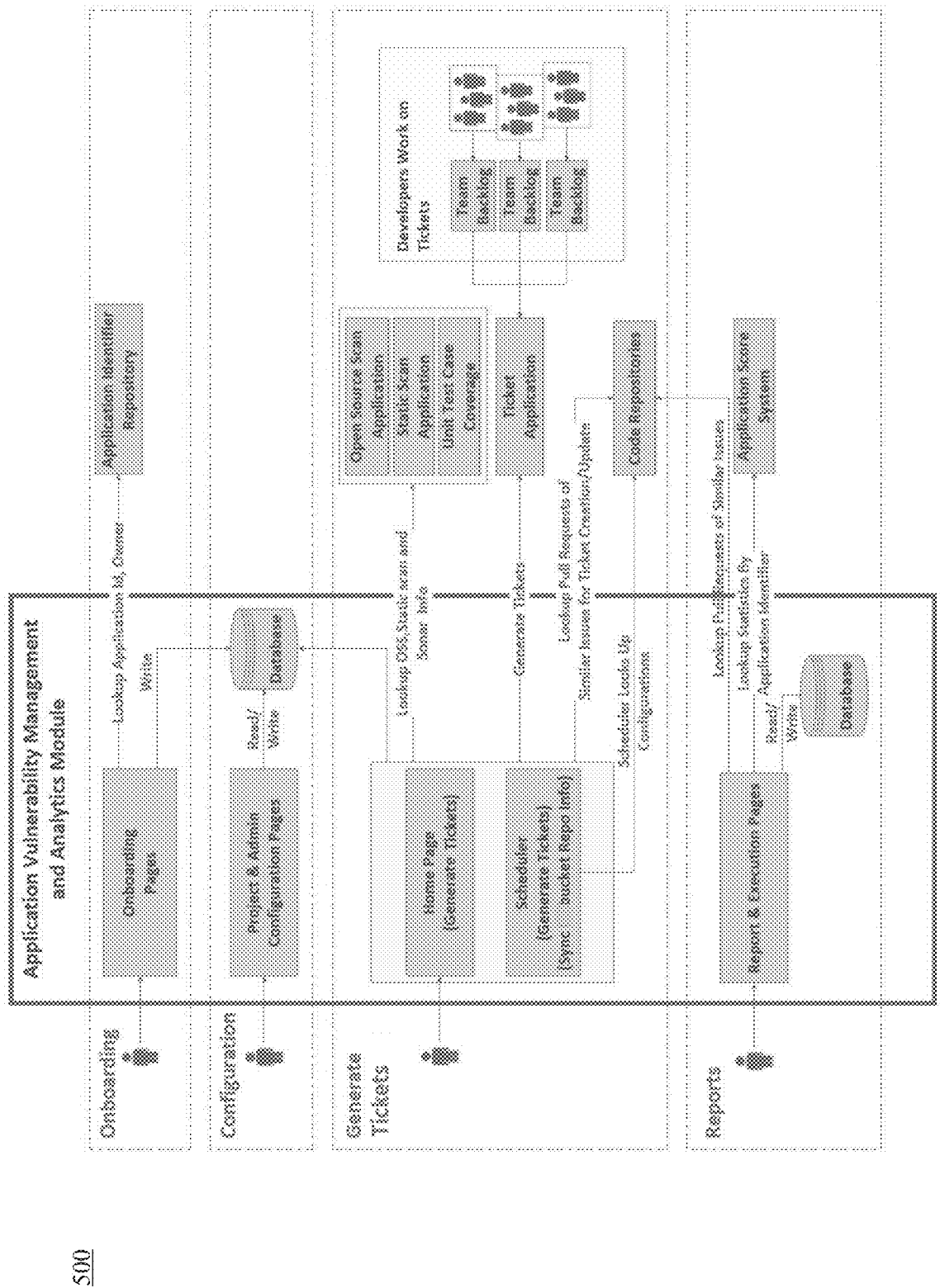
FIG. 5 is an architecture diagram of an exemplary process for implementing a method for providing vulnerability and code scan management via automated job scheduling and automated issue ticketing to facilitate application development and deployment.

FIG. 5 is an architecture diagram 500 of an exemplary process for implementing a method for providing vulnerability and code scan management via automated job scheduling and automated issue ticketing to facilitate application development and deployment. In FIG. 5, the exemplary process may call application programming interfaces (APIs) directly on a scheduled basis to generate and update real-time issue tickets consistent with present disclosures.

As illustrated in FIG. 5, an application may be onboarded, and corresponding configurations may be saved in a database. A scheduled job may be generated based on the configurations to automatically check for vulnerabilities. When a vulnerability is identified, a real-time issue ticket may be generated and updated with relevant information for the vulnerability. The relevant information may include how to fix information, when to fix the vulnerability by information, etc.

The real-time issue ticket may then be placed in a backlog of a user associated with the application. The real-time issue ticket may notify the user that a vulnerability has been detected in the application. Additionally, whether a pull request has been generated to fix the vulnerability may be determined. When the pull request has been generated to fix the vulnerability, the real-time issue ticket may be linked to the pull request. The linking of the pull request may enable quick access for the user to possible resolutions.

Figure 6:
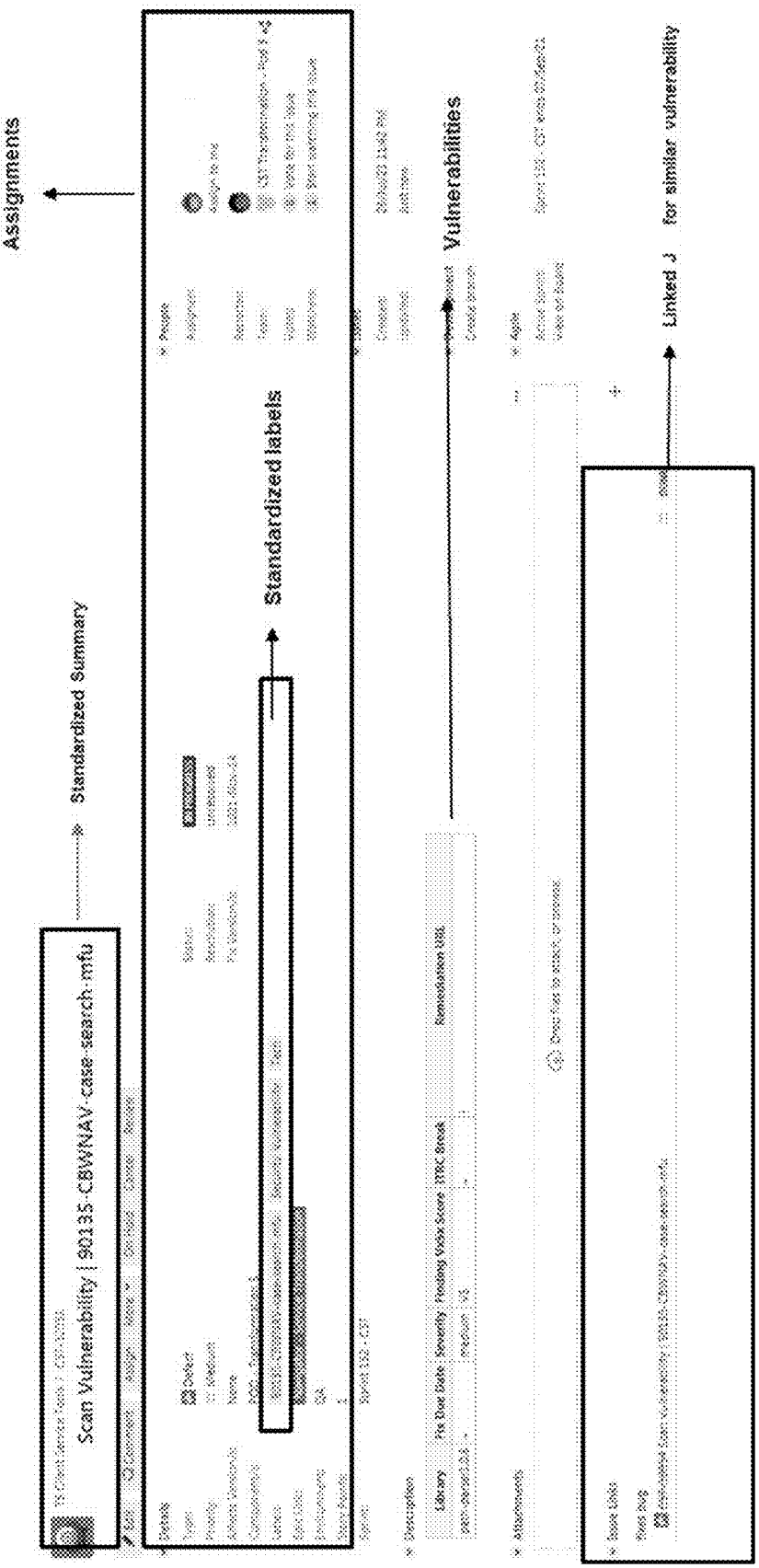
FIG. 6 is a screen shot that illustrates a standardized ticketing graphical user interface that is usable for implementing a method for providing vulnerability and code scan management via automated job scheduling and automated issue ticketing to facilitate application development and deployment, according to an exemplary embodiment.

FIG. 6 is a screen shot 600 that illustrates a standardized ticketing graphical user interface that is usable for implementing a method for providing vulnerability and code scan management via automated job scheduling and automated issue ticketing to facilitate application development and deployment, according to an exemplary embodiment. In FIG. 6, the standardized ticket may be usable across development teams to facilitate resolution of detected vulnerabilities.

As illustrated in FIG. 6, the standardized ticket may include a standardized summary of the vulnerability. The standardized summary may describe the vulnerability in a standard manner to enhance identification of the vulnerability across various development teams. Similarly, the standardized ticket may include standardized labels to present the vulnerability in a standard manner.

In another exemplary embodiment, the standardized ticket may include assignment information. The assignment information may provide information relating to the developers who are assigned to resolve the vulnerability. In another exemplary embodiment, the standardized ticket may include links to determined remediation actions for the vulnerability as well as links to similar vulnerabilities. The linking of the determined remediation actions and similar vulnerabilities may enable quick access for a user to possible resolutions.

Accordingly, with this technology, an optimized process for providing vulnerability and code scan management via automated job scheduling and automated issue ticketing to facilitate application development and deployment is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing vulnerability management to facilitate application development and deployment, the method being implemented by at least one processor, the method comprising:
   receiving, by the at least one processor, at least one monitoring request that includes at least one identifier, the at least one identifier corresponding to an application;
   onboarding, by the at least one processor, the application by using the at least one identifier;
   generating, by the at least one processor, at least one scheduled task for the application based on an outcome of the onboarding, the at least one scheduled task relating to source code vulnerability analytics;
   automatically initiating, by the at least one processor via an application programming interface, the at least one scheduled task based on a predetermined parameter;
   determining, by the at least one processor, whether a set of source codes that corresponds to the application includes at least one vulnerability based on a result of the automatically initiated at least one scheduled task; and
   generating, by the at least one processor, at least one ticket when the at least one vulnerability is included in the set of source codes.

2. The method of claim 1, wherein the at least one ticket relates to a work item of a responsible party associated with the application, the work item corresponding to an activity in a backlog that is managed by the responsible party.

3. The method of claim 1, wherein the at least one ticket includes a standardized template that facilitates issue tracking and monitoring, the standardized template including vulnerability detection tool information, vulnerability labeling information, and developer assignment information.

4. The method of claim 1, further comprising:
   identifying, by the at least one processor, at least one labeling strategy for the application based on the at least one vulnerability and a severity level;
   generating, by the at least one processor, at least one graphical element for the application, the at least one graphical element including a dashboard that contains information from the at least one ticket and the at least one labeling strategy; and
   displaying, by the at least one processor via a graphical user interface, the at least one graphical element.

5. The method of claim 1, further comprising:
   compiling, by the at least one processor, data that relates to at least one from among the application and the at least one vulnerability, the data including deadline information relating to resolution of the at least one vulnerability; and
   updating, by the at least one processor, the at least one ticket to include the data.

6. The method of claim 1, further comprising:
   automatically determining, by the at least one processor using at least one model, at least one mitigation action that relates to the at least one vulnerability; and
   updating, by the at least one processor, the at least one ticket to include information that relates to the at least one mitigation action.

7. The method of claim 6, further comprising:
   automatically initiating, by the at least one processor, the at least one mitigation action based on a predetermined user setting; and
   generating, by the at least one processor, at least one execution report, the at least one execution report including data that corresponds to the automatic determining of the at least one mitigation action and the automatic initiating of the at least one mitigation action.

8. The method of claim 1, further comprising:
   automatically determining, by the at least one processor, whether at least one pull request that relates to the at least one vulnerability is generated, the at least one pull request relating to a previously generated mitigation action for the at least one vulnerability;
   associating, by the at least one processor, the at least one pull request with the at least one ticket when the at least one pull request is generated; and
   updating, by the at least one processor, the at least one ticket to include information that relates to the at least one pull request.

9. The method of claim 1, wherein onboarding the application further comprises:
   pulling, by the at least one processor using the application programming interface, data that corresponds to the application based on the at least one identifier;
   requesting, by the at least one processor via a graphical user interface, at least one privilege setting that corresponds to the application, the at least one privilege setting including at least one from among a scanning privilege setting and a reading privilege setting;
   generating, by the at least one processor, a configuration file that corresponds to the application based on the pulled data and the at least one privilege setting; and
   persisting, by the at least one processor, the configuration file in a source code repository that is hosting the application.

10. A computing device configured to implement an execution of a method for providing vulnerability management to facilitate application development and deployment, the computing device comprising:
   a processor;
   a memory; and
   a communication interface coupled to each of the processor and the memory,
   wherein the processor is configured to:
      receive at least one monitoring request that includes at least one identifier, the at least one identifier corresponding to an application;

onboard the application by using the at least one identifier;

generate at least one scheduled task for the application based on an outcome of the onboarding, the at least one scheduled task relating to source code vulnerability analytics;

automatically initiate, via an application programming interface, the at least one scheduled task based on a predetermined parameter;

determine whether a set of source codes that corresponds to the application includes at least one vulnerability based on a result of the automatically initiated at least one scheduled task; and generate at least one ticket when the at least one vulnerability is included in the set of source codes.

11. The computing device of claim 10, wherein the at least one ticket relates to a work item of a responsible party associated with the application, the work item corresponding to an activity in a backlog that is managed by the responsible party.

12. The computing device of claim 10, wherein the at least one ticket includes a standardized template that facilitates issue tracking and monitoring, the standardized template including vulnerability detection tool information, vulnerability labeling information, and developer assignment information.

13. The computing device of claim 10, wherein the processor is further configured to:

identify at least one labeling strategy for the application based on the at least one vulnerability and a severity level;

generate at least one graphical element for the application, the at least one graphical element including a dashboard that contains information from the at least one ticket and the at least one labeling strategy; and display, via a graphical user interface, the at least one graphical element.

14. The computing device of claim 10, wherein the processor is further configured to:

compile data that relates to at least one from among the application and the at least one vulnerability, the data including deadline information relating to resolution of the at least one vulnerability; and update the at least one ticket to include the data.

15. The computing device of claim 10, wherein the processor is further configured to:

automatically determine, by using at least one model, at least one mitigation action that relates to the at least one vulnerability; and update the at least one ticket to include information that relates to the at least one mitigation action.

16. The computing device of claim 15, wherein the processor is further configured to:

automatically initiate the at least one mitigation action based on a predetermined user setting; and generate at least one execution report, the at least one execution report including data that corresponds to the automatic determining of the at least one mitigation action and the automatic initiating of the at least one mitigation action.

17. The computing device of claim 10, wherein the processor is further configured to:

automatically determine whether at least one pull request that relates to the at least one vulnerability is generated, the at least one pull request relating to a previously generated mitigation action for the at least one vulnerability;

associate the at least one pull request with the at least one ticket when the at least one pull request is generated; and update the at least one ticket to include information that relates to the at least one pull request.

18. The computing device of claim 10, wherein, to onboard the application, the processor is further configured to:

pull, by using the application programming interface, data that corresponds to the application based on the at least one identifier;

request, via a graphical user interface, at least one privilege setting that corresponds to the application, the at least one privilege setting including at least one from among a scanning privilege setting and a reading privilege setting;

generate a configuration file that corresponds to the application based on the pulled data and the at least one privilege setting; and persist the configuration file in a source code repository that is hosting the application.

19. A non-transitory computer readable storage medium storing instructions for providing vulnerability management to facilitate application development and deployment, the storage medium comprising executable code which, when executed by a processor, causes the processor to:

receive at least one monitoring request that includes at least one identifier, the at least one identifier corresponding to an application;

onboard the application by using the at least one identifier;

generate at least one scheduled task for the application based on an outcome of the onboarding, the at least one scheduled task relating to source code vulnerability analytics;

automatically initiate, via an application programming interface, the at least one scheduled task based on a predetermined parameter;

determine whether a set of source codes that corresponds to the application includes at least one vulnerability based on a result of the automatically initiated at least one scheduled task; and generate at least one ticket when the at least one vulnerability is included in the set of source codes.

20. The storage medium of claim 19, wherein the at least one ticket relates to a work item of a responsible party associated with the application, the work item corresponding to an activity in a backlog that is managed by the responsible party.

* * * * *